Nov. 26, 1957 K. C. DEMETRIOU ET AL 2,814,744
ASSEMBLY OF ELECTRO-MECHANICAL APPARATUS
Filed April 8, 1955
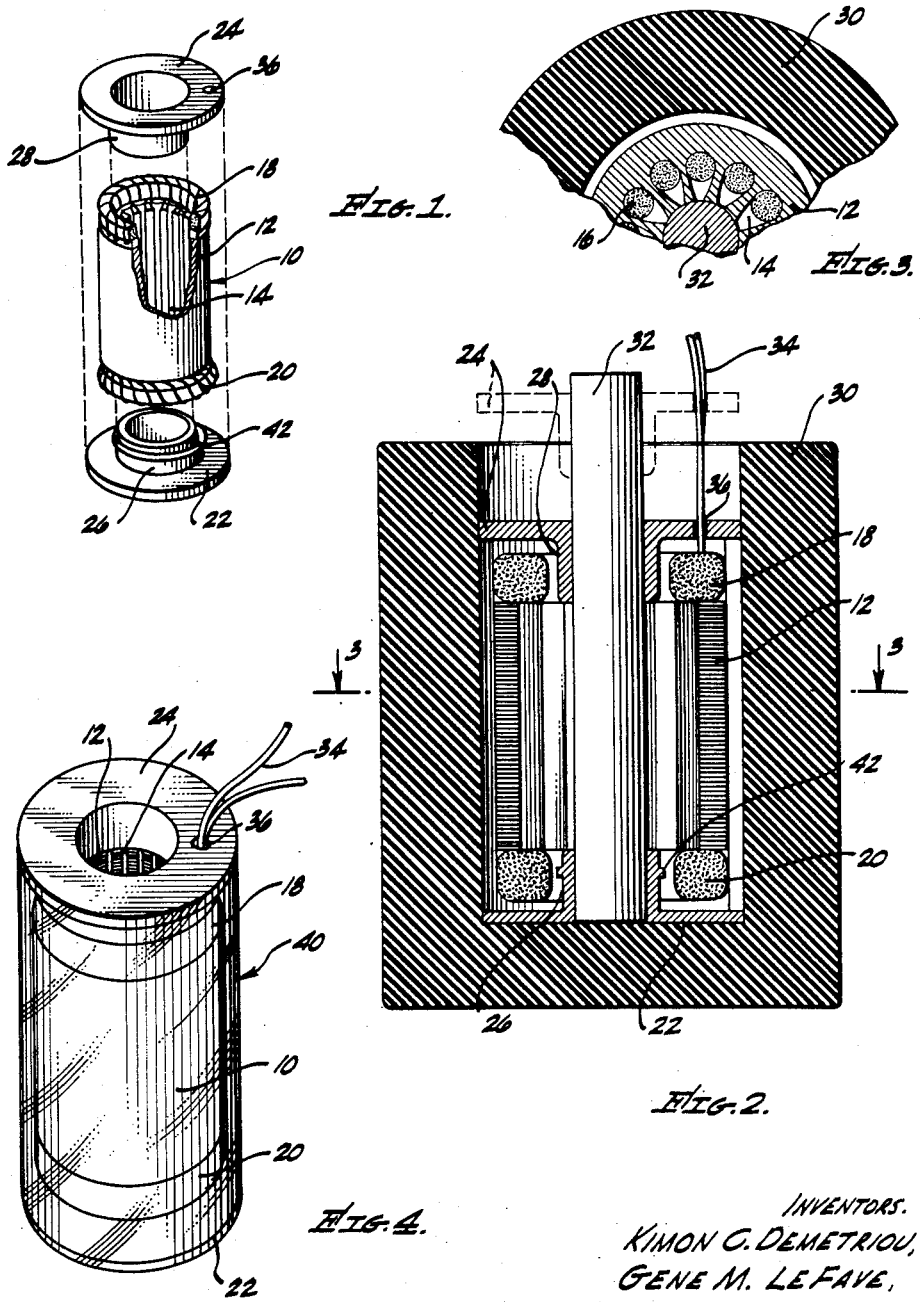
INVENTORS.
KIMON C. DEMETRIOU,
GENE M. LE FAVE,
BY
Perry E. Turner
AGENT.

United States Patent Office 2,814,744
Patented Nov. 26, 1957

2,814,744

ASSEMBLY OF ELECTRO-MECHANICAL APPARATUS

Kimon C. Demetriou, Malibu, and Gene M. Le Fave, Granada Hills, Calif., assignors to Lear, Incorporated, Santa Monica, Calif.

Application April 8, 1955, Serial No. 500,198

4 Claims. (Cl. 310—43)

This invention relates to assemblies of electrical apparatus and more particularly to a method of and a means for providing a unitary assembly of electrical and mechanical parts for electro-mechanical apparatus.

Prior art assembly of electro-mechanical apparatus involves numerous hand operations to secure electrical and mechanical parts in fixed spaced relation. Further, the assembly often is secured to a housing or support in which various surfaces have to be machined to insure alignment of parts; for example, in a housing to support a stator, end openings must be accurately aligned with the bore of the stator to receive a rotor shaft, and machining of various surfaces within the housing is generally required to obtain this alignment. Also, additional steps must be taken to coat or insulate the electrical parts to protect them during changes in environmental conditions. These various steps are time consuming and tend to limit the rate at which the assemblies can be produced. Further, and in spite of precautions in assembly, the finished assemblies occasionally do not perform satisfactorily because parts become loosened, dimensions of inner openings or bores are not maintained, and insulating coatings fail.

It is an object of this invention to provide a unitary assembly of electrical apparatus which can be made with a minimum of hand and machining operations, wherein electrical parts are protected against extreme variations in environmental conditions, and which is capable of being reproduced in volume with uniformity of characteristics.

It is another object of this invention to provide a method of and means for providing an assembly of electrical apparatus wherein parts are maintained in fixed spaced relation and cannot become loosened.

It is a further object of this invention to provide an assembly and a method of assembly for electrical apparatus, wherein the dimensions of inner openings are maintained throughout a long operating life.

It is still another object of this invention to provide an assembly of electrical apparatus which comprises a minimum number of component parts which can be assembled in a minimum number of steps, and which is capable of highly reliable operation over a long operating life.

The above and other objects and advantages of this invention will become aparent from the following description taken in conjunction with the accompanying drawing, in which an embodiment is illustrated by way of example. The scope of the invention is pointed out in the appended claims. In the drawings, Fig. 1 is an exploded view of parts of electrical apparatus to be assembled;

Fig. 2 is a sectional view of the parts of Fig. 1 in a mold for assembly;

Fig. 3 is a partial sectional view taken along line 3—3 of Fig. 2; and

Fig. 4 is a perspective view of the complete assembly.

In accordance with this invention, electrical and mechanical parts are housed, supported and insulated by a common substance. The parts may be assembled by placing them in a mold, inserting an arbor into each opening which is to be maintained, pouring a liquid compound into the mold to fill all crevices and openings, evacuating to remove air from the liquid compound and curing the compound to furnish a complete unitary assembly.

This invention will be described in connection with a stator assembly for a synchronous motor. It will become apparent, however, that the invention is applicable to any assembly of electro-mechanical apparatus.

Referring to Figs. 1–3, the parts to be assembled comprise a stator 10 having a body 12 built up from stacked metal laminations. The laminations are provided with spaced notches about their inner diameters so as to provide body 12 with longitudinal grooves 14 as indicated in Fig. 1. Conductors are fitted in grooves 14 as indicated at 16 in Fig. 3 and are led from the ends of the grooves as indicated at 18 and 20, where they are interconnected in accordance with a desired or conventional wiring scheme.

The other parts to be assembled with stator 10 comprise a pair of inserts 22 and 24. Inserts 22 and 24 are provided with respective bosses 26 and 28 having inner diameters equal to the bore of stator 10 as defined by the inner diameter of body 12. The outer diameters of boss 26 and 28 are sufficiently small to permit them to be inserted within the conductors 18 and 20 to fit against the adjacent end of body 12.

To facilitate assembly of the parts above described, a mold 30 is employed which has a cylindrical opening in one surface equal to the outer diameter of an insert 22 or 24. Insert 22 is placed in the bottom of the mold as shown in Fig. 2, and stator 10 is lowered to permit the end of boss 26 to register against the end of body 12. An arbor 32 is inserted through the bore of stator 10 and the boss 26 of insert 22 to register at its lower end at the bottom of the opening of mold 30. Leads 34 from the conductors are led out of mold 30.

A liquid compound or synthetic resin is next poured into the mold to fill all openings and crevices which are exposed to air. In this manner, liquid fills the portions of grooves 14 not occupied by conductors; further, the individual conductors are surrounded by the liquid. The space between the end conductors 18 and 20 and associated boses 28 and 26 are likewise filled by the liquid. In addition, the liquid fills the space between the outer surface of stator 10 and the inner wall of the opening of the mold 30.

The compound employed preferably should have the following characteristics when hardened: it should possess mechanical strength, it should provide insulation for the conductors coated by it, it should be able to hold different parts with which it is in contact in fixed spaced relation, and it should be able to withstand extreme environmental conditions such as temperature or thermal shocks. One example of a suitable compound comprises a mixture of a low viscosity epoxy resin, of the type obtained by reaction of epichlorohydrin with bisphenol A, and a filler material such as mica or aluminum oxide. Further, the compound contains a suspending agent, which may be selected from organo-titanium esters or a lipophilic non-ionic surface active agent. Examples of the esters are hydroxy-titanium stearate or oleate; examples of the surface active agent are ethylene oxide condensate of tertiary butyl or sorbitol reaction product with abietic acid. The filler may comprise from 30% to 50% of the total plastic compound, and the suspending agent comprises a maximum of 3% of the total filler material. The filler preferably is fine enough to pass a 325-mesh screen.

In lieu of a filler, an epoxy resin as described above may be cured with a catalyst such as m-phenylenediamine to attain a heat distortion point high enough for this application as well as to provide resistance to thermal shock.

After the liquid compound is poured into the mold as above explained, it is subjected to a vacuum to remove air bubbles which may be present in the liquid. Following this evacuation, the insert 24 is fitted over arbor 32, as indicated in dotted lines in Fig. 2, and the leads 34 are drawn through an opening 36 provided in the flange of insert 24. Insert 24 is then lowered to permit the end of boss 28 to register against the adjacent end of body 12, as indicated in solid lines in Fig. 2. The compound is then heated to be cured, as by placing the mold and assembly in an oven and heating until the desired degree of cure is effected. The heating may be at 250° F. for two hours to effect curing and hardening, or such heating may be carried out at a lower temperature for a longer period, e. g., 180° F. for twelve to sixteen hours.

It should be pointed out here that the avacuation and heating can be carried out simultaneously, providing temperature is not high enough to inconveniently accelerate cure but is high enough to lower resin viscosity sufficiently to expedite evacuation.

After the compound has hardened, arbor 32 and the assembly are removed from the mold. The arbor is then removed from the assembly, which is a unitary structure with all parts secured by the hardened compound.

The completed unitary assembly is illustrated in Fig. 4. As shown in Fig. 4, stator 10 is supported in a housing which comprises inserts 22, 24 and the hardening compound generally indicated at 40. If desired, the outer peripheral surfaces of the bosses 26, 28 may be made rough or provided with suitable projections, as by the small flange 42 illustrated on boss 26 (see Figs. 1 and 2), to facilitate adherence of the compound 40 to the boss.

The body material 40 preferably can be machined accurately. The arbor need not be used, because the bore could be filled with the compound and the material subsequently machined accurately to provide desired bore dimensions.

What is claimed is:

1. In combination, a cylindrical laminated core having a central opening, said core having a plurality of slots therein, a plurality of conductors extending through the slots and arranged at the opposite end faces of the core in coils substantially concentric with the axis of said core, an end plate at each end of the core being substantially greater in diameter than said core and having an inwardly projecting boss, each boss projecting within the coil of conductors and registering at its inner end against the end face of the core, said end plates and their bosses having central openings of substantially the diameter of the central opening in the core to receive and support a shaft for rotation within the central opening of the core, end leads for the conductors extending through one of said end plates, a common synthetic resin substance having insulating and mechanical bonding properties and characterized by high mechanical strength to withstand dimensional changes under varying environmental conditions, said substance coating the conductors and filling all spaces therebetween, said substance also filling the slots in the core and the spaces between the coils of conductors and the adjacent end plates and bosses, and said substance surrounding the core and adhering to said end plates to provide with said end plates a unitary housing for the core and conductors.

2. In a machine having a cylindrical laminated core member with a central opening, wherein a plurality of conductors extend through slots in the core and are arranged externally of the core adjacent each end face thereof in a coil and connected in accordance with a desired wiring scheme, the combination of a pair of end caps each having a flat disc portion and an inwardly projecting boss, the boss of each end cap extending through the coil of conductors and registering at its inner end against the end face of the core; the diameter of each disc portion being substantially larger than the outer diameter of the core; said end caps each having a central opening of substantially the diameter of the inner opening of the core extending through the disc portion and boss thereof; a synthetic resin substance surrounding the core and adhering to the end caps to provide with the end caps a housing of substantially the diameter of the disc portion of an end cap and of a length equal to the combined lengths of the core and the bosses; said synthetic resin substance also coating the conductors, filling all spaces between and surrounding the conductors in the core slots, and filling all the spaces between the coils of conductors and the bosses and disc portions of the end caps; said substance being characterized by insulating and mechanical bonding properties whereby to hold the conductors, the core and the end caps in fixed spaced relation, and to provide protective insulation for the conductors; and said substance also being characterized by mechanical strength whereby to withstand dimensional variations over wide variations in environmental conditions.

3. In combination with a cylindrical laminated core having a central bore and provided with a plurality of slots along its inner surface, wherein a plurality of interconnected conductors extend through the slots and are arranged at their ends in coils adjacent the end faces of the core and substantially concentric with the axis of the core, an insert at each end of the core having a disc portion of substantially greater diameter than the outer diameter of the core, a hub member of reduced diameter extending inwardly from the disc portion of each insert and registering at its inner end against the end face of the core, the coil of conductors at each end of the core surrounding the hub member thereat and being spaced therefrom, said hub members each having a length greater than the thickness of the adjacent coil of conductors, whereby the disc portions of said inserts are axially spaced from the coils of conductors, a synthetic resin substance surrounding the core and being of the diameter of the disc portion of an insert, said substance adhering to and extending between the opposed surfaces of the disc portions to provide with said inserts a unitary housing for the core and conductors, terminal leads for the conductors extending through the disc portion of one of said inserts, said substance also filling all spaces in the slots unoccupied by conductors and also filling all spaces surrounding the hub members which are unoccupied by conductors in the coils of conductors, and said substance having high bonding properties and mechanical strength for holding the conductors, core and inserts in fixed spaced relation over wide variations in environmental conditions.

4. An assembly of a cylindrical laminated core having a central bore and provided with a plurality of longitudinal slots, wherein a plurality of conductors are placed in the slots and arranged in coils substantially concentric with the axis of the core adjacent the ends thereof, said assembly being formed by placing the core and conductor arrangement in a cylindrical open-face mold with an insert at each end of the core; each insert having a disc portion substantially greater in diameter than the core and equal to the diameter of the mold, and an inwardly projecting boss on each disc portion extending within the coil of conductors to register at its inner end against the end of the core, each of said inserts having a central opening extending through its disc portion and boss; leading terminal leads of the conductors through one of said inserts to the exterior of said mold; inserting an arbor through the central openings in the inserts and the bore in the core, and pouring into the mold a synthetic resin substance to surround the core and fill all exposed spaces and crevices between the opposed disc portions; said substance upon hardening adhering to and holding the inserts, core and conductors, in fixed spaced relation; the hardened substance and inserts together providing a housing for the core and conductors and the inserts providing support members for a shaft to be rotated within the bore of the core; and the hardened substance also having insulating properties and mechanical strength to withstand dimensional changes over wide variations in environmental conditions, thereby to provide insulation and protection for the conductors and core.

References Cited in the file of this patent

UNITED STATES PATENTS

| | | |
|---|---|---|
| 1,440,952 | Apple | Jan. 2, 1923 |
| 1,793,986 | Apple | Feb. 24, 1931 |
| 1,911,341 | Apple | May 30, 1933 |
| 1,921,111 | Apple | Aug. 8, 1933 |
| 2,548,133 | Treat | Apr. 10, 1951 |
| 2,648,018 | Meier | Aug. 4, 1953 |
| 2,668,925 | Blosser | Feb. 9, 1954 |